(12) United States Patent
Yamaguchi (10) Patent No.: US 12,175,815 B2
(45) Date of Patent: Dec. 24, 2024

(54) ACCIDENT INFORMATION RECORDING DEVICE

(71) Applicant: TOYOTA JIDOSHA KABUSHIKI KAISHA, Toyota (JP)

(72) Inventor: Yohsuke Yamaguchi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 347 days.

(21) Appl. No.: 17/544,142

(22) Filed: Dec. 7, 2021

(65) Prior Publication Data

US 2022/0254201 A1     Aug. 11, 2022

(30) Foreign Application Priority Data

Feb. 8, 2021   (JP) .................................. 2021-017960

(51) Int. Cl.
G07C 5/08      (2006.01)

(52) U.S. Cl.
CPC ........... G07C 5/085 (2013.01); G07C 5/0816 (2013.01)

(58) Field of Classification Search
CPC .... G07C 5/085; G07C 5/0816; G07C 5/0841; G07C 5/008; G06F 12/0238; H04L 12/40; H04L 2012/40215; H04L 2012/40273
See application file for complete search history.

(56) References Cited

U.S. PATENT DOCUMENTS

| | | | |
|---|---|---|---|
| 6,195,602 B1* | 2/2001 | Hazama ................. | G07C 5/008 701/29.6 |
| 2009/0271063 A1* | 10/2009 | Yasue ..................... | B60R 25/04 701/31.4 |
| 2010/0130242 A1* | 5/2010 | Hayashi .............. | H04W 12/062 340/901 |
| 2023/0078706 A1* | 3/2023 | Makabe ................... | B66B 3/00 187/380 |

FOREIGN PATENT DOCUMENTS

| | | | | |
|---|---|---|---|---|
| JP | 2007237798 A | * | 9/2007 | |
| JP | 2011238134 A | | 11/2011 | |
| WO | WO-2015152648 A1 | * | 10/2015 | ............. B62D 41/00 |

OTHER PUBLICATIONS

English Translation of WO-2015152648-A1 (Year: 2024).*
English Translation of JP-2007237798-A (Year: 2024).*

* cited by examiner

*Primary Examiner* — Jess Whittington
*Assistant Examiner* — Shahira Baajour
(74) *Attorney, Agent, or Firm* — SoraIP, Inc.

(57) ABSTRACT

An accident information recording device mounted on a vehicle that includes a storage device that stores vehicle identification information includes a non-volatile recording device and a recording control device. The recording control device is configured to record the vehicle identification information, which is acquired from the storage device when the vehicle is shipped from a factory, in a first recording region of the recording device. The recording control device (Continued)

is configured to record information about the vehicle at the time of an accident in the recording device, and to record the vehicle identification information, which is acquired from the storage device, in a second recording region of the recording device during a period since the recording control device is activated until the recording control device records the information about the vehicle at the time of the accident.

5 Claims, 4 Drawing Sheets

ACCIDENT INFORMATION RECORDING DEVICE

CROSS-REFERENCE TO RELATED APPLICATION

This application claims priority to Japanese Patent Application No. 2021-017960 filed on Feb. 8, 2021, incorporated herein by reference in its entirety.

BACKGROUND

1. Technical Field

The present disclosure relates to an accident information recording device to be mounted on a vehicle such as an automobile.

2. Description of Related Art

An accident information recording device is also called an "event data recorder". The accident information recording device is configured to record, when it is determined that a condition for recording set in advance for an accident is met, information about a vehicle at the time of the accident, such as the status of braking and driving operations before and after the accident, in a non-volatile recording device together with vehicle identification information. The information about the vehicle at the time of the accident will be used to analyze the accident after the accident.

Japanese Unexamined Patent Application Publication No. 2011-238134 (JP 2011-238134 A), for example, describes an accident information recording device configured to acquire a vehicle body number and peculiar key information of a vehicle when an ignition switch is turned on and to record, when an accident occurs, information about the vehicle at the time of the accident in a recording device together with the vehicle body number and the peculiar key information of the vehicle.

SUMMARY

In the accident information recording device, when it is not determined that the condition for recording set in advance is met even if the vehicle is involved in an accident, information about the vehicle at the time of the accident and the vehicle identification information are not recorded in the recording device. In addition, the accident information recording device is replaceable.

Therefore, when no information about the vehicle at the time of an accident or no vehicle identification information is recorded in the recording device even if the vehicle is involved in an accident, it cannot be determined whether the absence of any record is because it was not determined that the condition for recording set in advance was met or because the accident information recording device was replaced after the accident.

The present disclosure provides an accident information recording device improved to be able to specify the reason for the absence of any record when no information about a vehicle at the time of an accident or no vehicle identification information is recorded in a recording device.

A first aspect of the present disclosure provides an accident information recording device mounted on a vehicle that includes a storage device that stores vehicle identification information, including a non-volatile recording device and a recording control device. The recording control device is configured to record the vehicle identification information in a first recording region of the recording device. The vehicle identification information recorded in the first recording region is acquired from the storage device when the vehicle is shipped from a factory. The recording control device is configured to record, when the recording control device determines that a condition for recording set in advance for an accident is met, information about the vehicle at a time of the accident in the recording device. The recording control device is configured to record the vehicle identification information in a second recording region of the recording device. The vehicle identification information recorded in the second recording region is acquired from the storage device during a period since the recording control device is activated until the recording control device records the information about the vehicle at the time of the accident in the recording device.

In the configuration described above, the vehicle identification information is acquired from the storage device and recorded in the first recording region of the recording device when the vehicle is shipped from a factory. Further, the vehicle identification information is acquired from the storage device and recorded in the second recording region of the recording device during a period since the recording control device is activated until the recording control device records the information about the vehicle at the time of the accident in the recording device.

When the accident information recording device has not been replaced, the vehicle identification information recorded in the first recording region is the same as the vehicle identification information stored in the storage device. When the accident information recording device has been replaced, on the contrary, the vehicle identification information recorded in the first recording region is different from the vehicle identification information stored in the storage device. Hence, it can be determined whether the accident information recording device has been replaced, by determining whether the vehicle identification information recorded in the first recording region of the recording device is the same as the vehicle identification information stored in the storage device after an accident of the vehicle.

Further, it can be determined that it was not determined that the condition for recording set in advance was met when information about the vehicle at the time of the accident is not recorded in the recording device and the vehicle identification information recorded in the first recording region is the same as the vehicle identification information stored in the storage device. On the contrary, it can be determined that the accident information recording device has been replaced with an accident information recording device of a different vehicle after the accident of the vehicle when information about the vehicle at the time of the accident is not recorded in the recording device and the vehicle identification information recorded in the first recording region is different from the vehicle identification information stored in the storage device.

In the accident information recording device according to the first aspect of the present disclosure, the recording control device may be configured to acquire the vehicle identification information from the storage device when the recording control device is activated in preparation to start travel of the vehicle.

In the aspect described above, the vehicle identification information (VIN) is acquired from the storage device when the recording control device is activated in preparation to start travel of the vehicle. Hence, the recording control device can acquire vehicle identification information (VIN) from the storage device before the vehicle substantially starts traveling.

In the accident information recording device according to the first aspect of the present disclosure, the recording control device may include a volatile provisional recording device. The recording control device may be configured to record the vehicle identification information acquired from the storage device in the provisional recording device. The recording control device may be configured to record the vehicle identification information recorded in the provisional recording device in the second recording region of the recording device when the information about the vehicle at the time of the accident is recorded in the recording device.

In the aspect described above, the vehicle identification information acquired from the storage device is recorded in the provisional recording device, and the vehicle identification information recorded in the provisional recording device is recorded in the second recording region of the recording device when information about the vehicle at the time of an accident is recorded in the recording device. Hence, it is possible to suppress the vehicle identification information recorded in the provisional recording device being unnecessarily recorded in the second recording region of the recording device when it is not determined that the condition for recording set in advance is met and information about the vehicle at the time of an accident is not recorded in the recording device. In addition, the vehicle identification information acquired from the storage device and recorded in the provisional recording device when the recording control device is activated in preparation to start travel of the vehicle can be recorded in the second recording region of the recording device.

In the accident information recording device according to the first aspect of the present disclosure, the recording control device may be configured to acquire the vehicle identification information from the storage device at each predetermined time, and to record the acquired vehicle identification information in the provisional recording device when a plurality of pieces of the acquired vehicle identification information is normal and the same.

The vehicle identification information may not be acquired normally from the storage device immediately after the recording control device is activated. In the aspect described above, the vehicle identification information is acquired from the storage device at each predetermined time, and the acquired vehicle identification information is recorded in the provisional recording device when a plurality of pieces of the acquired vehicle identification information is normal and the same. Hence, normal vehicle identification information can be recorded in the provisional recording device.

In the accident information recording device according to the first aspect of the present disclosure, the storage device may be included in a drive device control device that controls a drive device of the vehicle.

The vehicle is provided with a drive device and a drive device control device. In the aspect described above, the storage device is included in the drive device control device of the vehicle. Thus, it is not necessary to provide a read-only storage device, besides the drive device control device. Thus, it is possible to simplify the structure of the accident information recording device and reduce the cost compared to the case where a read-only storage device is provided, besides the drive device control device.

Other objects, other features, and accompanying advantages of the present disclosure will be easily understood from the description of an embodiment of the present disclosure made with reference to the following drawings.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 4 is a time chart illustrating a state in which a signal that indicates a vehicle identification number is transmitted from an engine electronic control device to a recording electronic control device after an ignition switch is turned on.

DETAILED DESCRIPTION OF EMBODIMENTS

Figure 1:
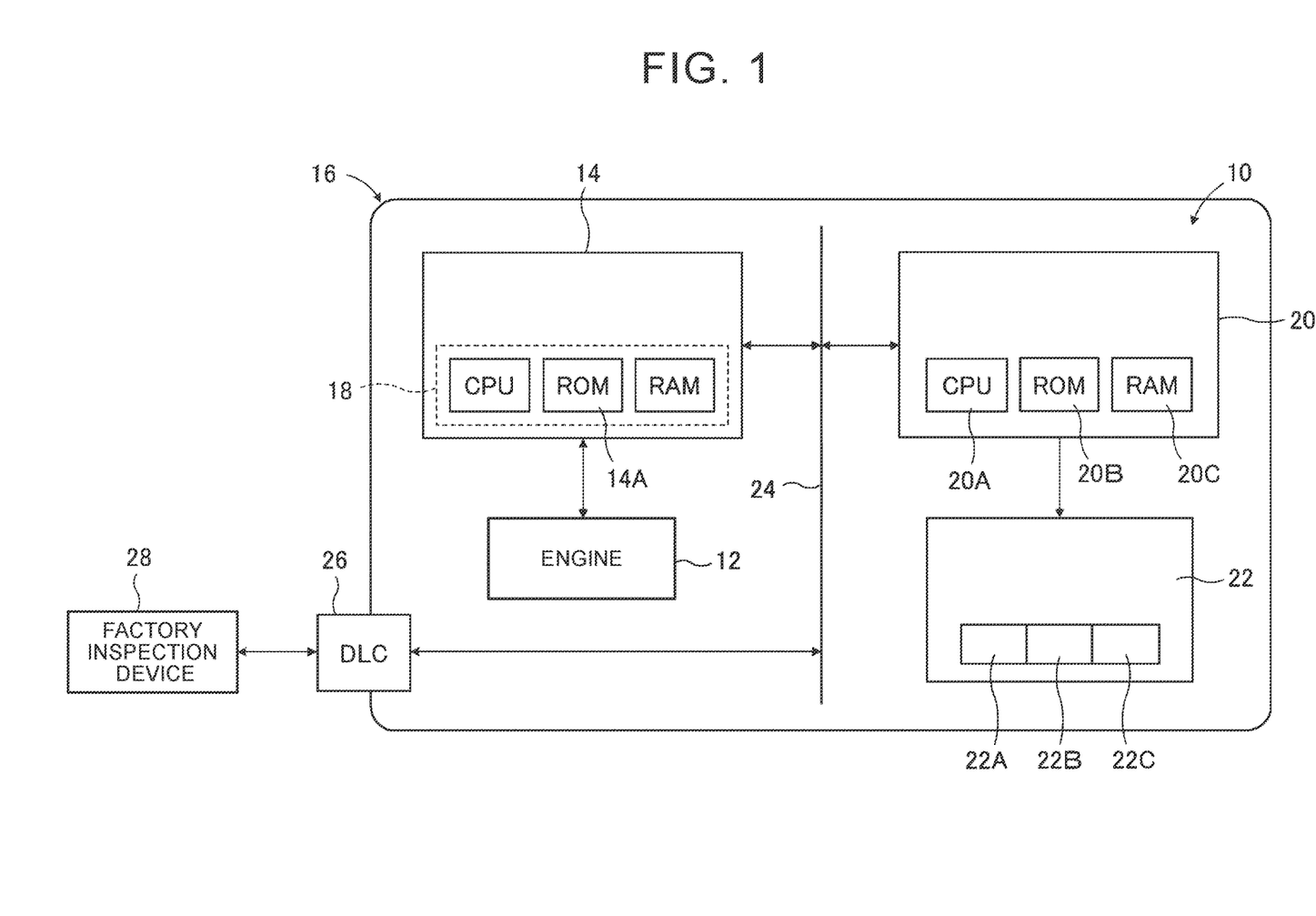
FIG. 1 is a schematic diagram illustrating an accident information recording device according to an embodiment of the present disclosure.

An accident information recording device 10 according to an embodiment is mounted on a vehicle 16 that includes an engine 12 as a drive device. The vehicle 16 includes an engine electronic control device 14 as a drive device control device. In the following description, an electronic control device will be abbreviated as an ECU (Electronic Control Unit). The drive device may not be an engine, and may be any drive device that is known in the technical field such as an electric motor and a hybrid system. The drive device control device may be a control device that controls the drive device.

In the embodiment, the engine ECU 14 includes a central processing unit (CPU), a read only memory (ROM) 14A, a random access memory (RAM), and an input/output port device (not illustrated). The engine ECU 14 includes a microcomputer 18 in which the CPU, the ROM 14A, the RAM, and the input/output port device are connected to each other through a bidirectional common bus (not illustrated). The engine ECU 14 is activated when an ignition switch (not illustrated) is turned on. The ROM 14A functions as a read-only storage device that stores a vehicle identification number, as vehicle identification information of the vehicle 16. The vehicle identification number is abbreviated as a VIN (Vehicle Identification Number) as necessary. The VIN may be inscribed on a frame etc. of the vehicle 16.

The accident information recording device 10 includes a recording ECU 20 and a non-volatile recording device 22. The recording ECU 20 is connected to the engine ECU 14 via a controller area network (CAN) 24. The recording device 22 can keep recorded information even when the recording ECU 20 is de-energized. That is, the recording device 22 may be any recording device that is known in the technical field such as a flash memory.

In the embodiment, the recording ECU 20 includes a CPU 20A, a ROM 20B, a RAM 20C, and an input/output port device (not illustrated). The recording ECU 20 is a microcomputer in which the CPU 20A, the ROM 20B, the RAM 20C, and the input/output device are connected to each other through a bidirectional common bus (not illustrated). The recording ECU 20 is activated when the ignition switch (not illustrated) is turned on. As described in detail later, the recording ECU 20 acquires a VIN stored in the ROM 14A of the engine ECU 14, and records the VIN in the RAM 20C as a provisional recording device.

When activated, the recording ECU 20 always records information about the vehicle required to analyze an accident in the RAM 20C in an overwriting manner for a predetermined time range. The information about the vehicle required to analyze an accident may be any information that is known in the technical field, for example a state quantity such as the vehicle speed of the vehicle 16, and a drive operation quantity such as a master cylinder pressure and an accelerator operation amount.

As described in detail later, when it is determined that a condition for recording set in advance for an accident is met, the recording ECU 20 causes the recording device 22 to record the VIN recorded in the RAM 20C, and causes the recording device 22 to record the information about the vehicle required to analyze an accident as information about the vehicle at the time of an accident. The information about the vehicle at the time of an accident is abbreviated as "accident information" as necessary.

The vehicle 16 includes a data link connector (DLC) 26 connected to the CAN 24. A factory inspection device 28 is connected to the DLC 26. The factory inspection device 28 is connected to the DLC 26 before shipment of the vehicle 16. The factory inspection device 28 performs a factory shipment inspection through self-diagnosis of the engine ECU 14, the recording ECU 20, and other electronic devices mounted on the vehicle 16. Further, the factory inspection device 28 determines that the factory shipment inspection has been passed when all the electronic devices are normal, and transmits a signal indicating that the factory shipment inspection has been passed to the recording ECU 20 via the DLC 26.

Figure 2:
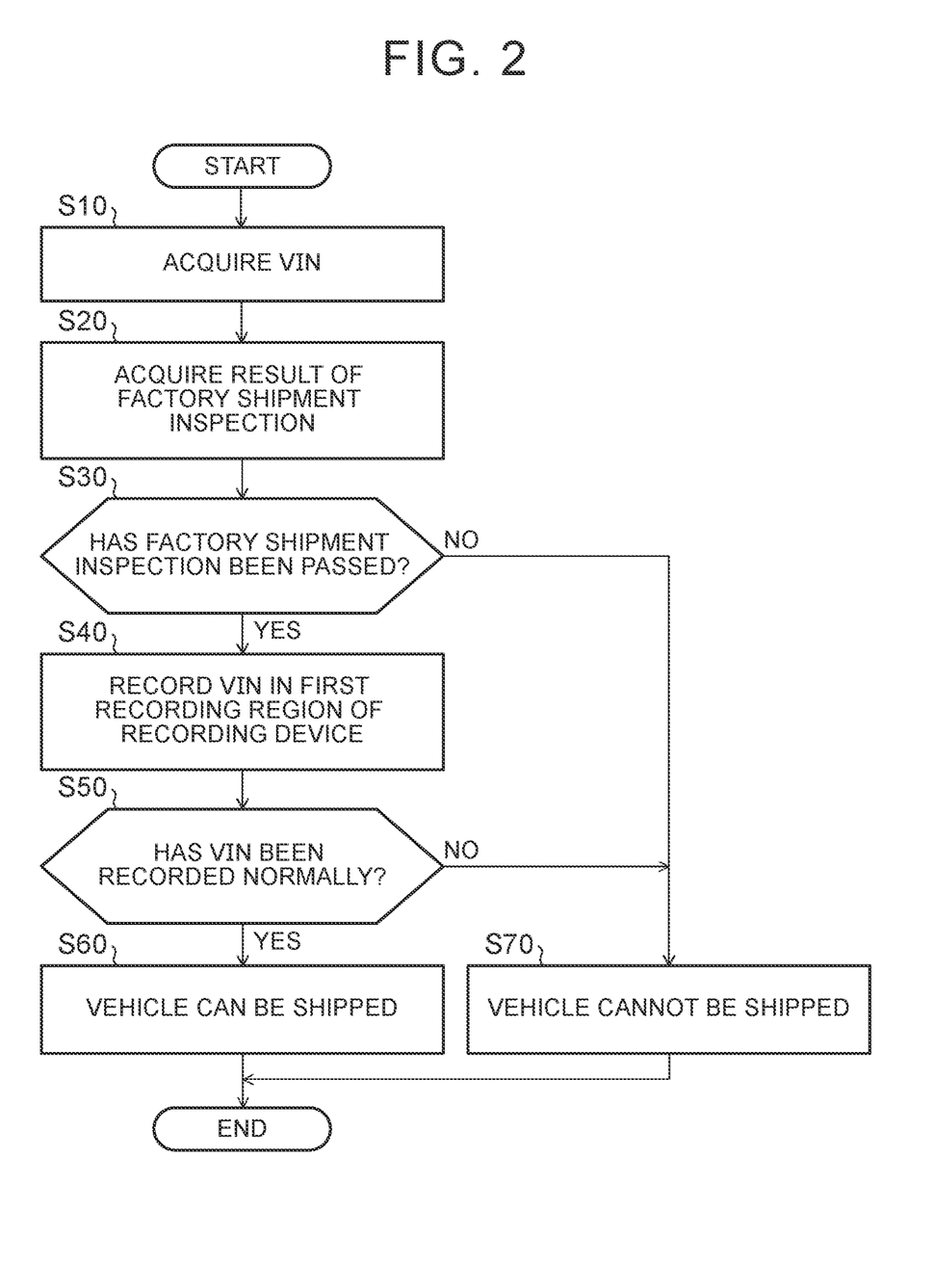
FIG. 2 is a flowchart illustrating a control routine for recording a vehicle identification number at the time of factory shipment.

The ROM 20B of the recording ECU 20 stores a control program for recording a VIN at the time of factory shipment of the vehicle, corresponding to the flowchart illustrated in FIG. 2. The CPU 20A of the recording ECU 20 reads the control program from the ROM 20B into the RAM 20C. As described in detail later, the CPU 20A of the recording ECU 20 controls recording of a VIN at the time of factory shipment in accordance with the flowchart illustrated in FIG. 2.

Figure 3:
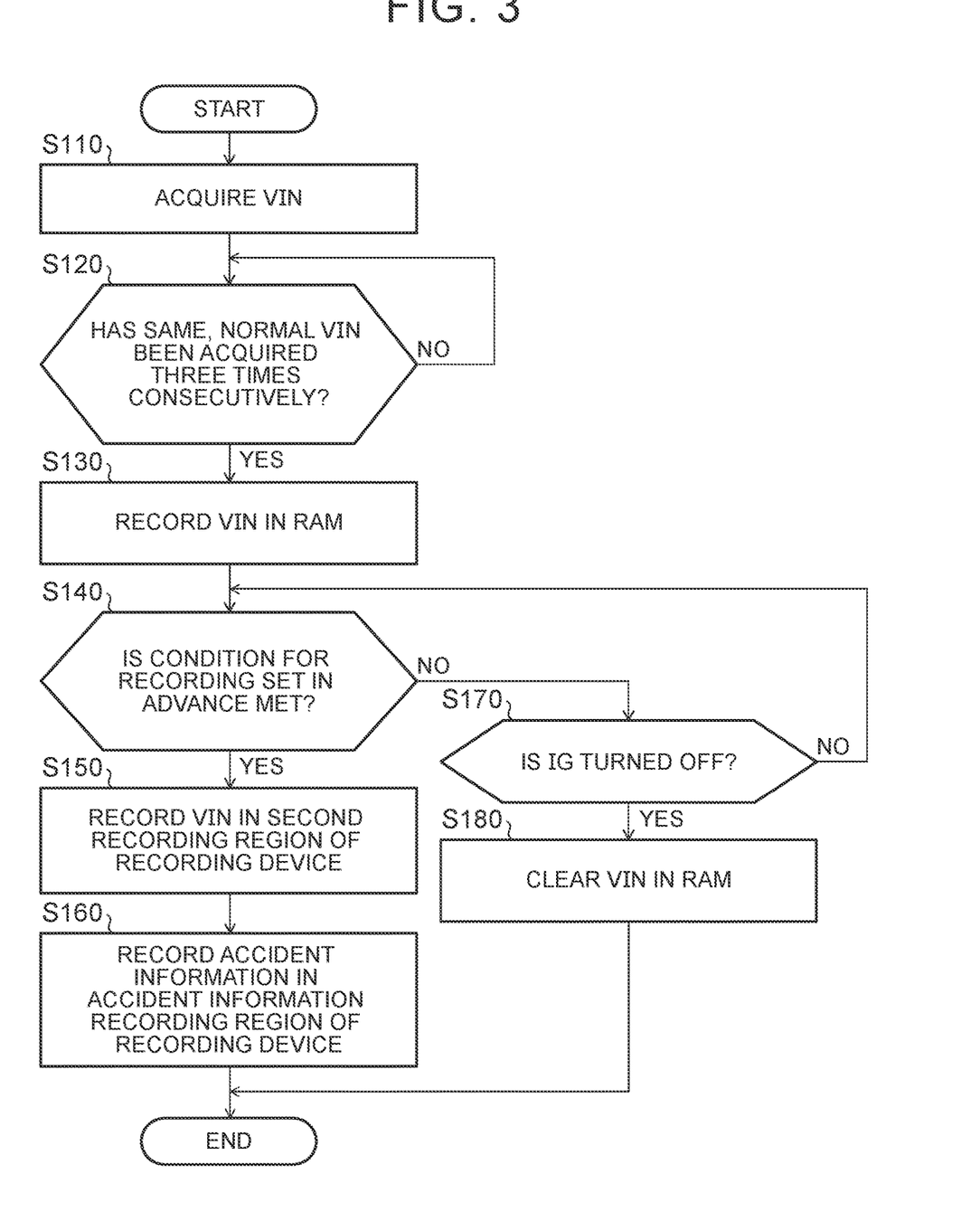
FIG. 3 is a flowchart illustrating a control routine for provisionally recording a vehicle identification number at the start of travel and recording a vehicle identification number at the time of an accident.

The ROM 20B of the recording ECU 20 further stores a control program for provisionally recording a VIN at the start of travel of the vehicle and for recording a VIN at the time of an accident of the vehicle, corresponding to the flowchart illustrated in FIG. 3. The CPU 20A of the recording ECU 20 reads the control program from the ROM 20B into the RAM 20C. As described in detail later, the CPU 20A of the recording ECU 20 controls provisional recording of a VIN at the start of travel of the vehicle and recording of a VIN at the time of an accident of the vehicle in accordance with the flowchart illustrated in FIG. 3.

Control of Recording of VIN at Time of Factory Shipment

Next, a control routine for recording a VIN at the time of factory shipment will be described with reference to the flowchart illustrated in FIG. 2. The control for recording a VIN according to the flowchart illustrated in FIG. 2 is executed by the CPU 20A of the recording ECU 20 after it is determined by the factory inspection device 28 that the factory shipment inspection has been passed and when the ignition switch (not illustrated) is turned on.

First, in step S10, the CPU 20A acquires a VIN after a predetermined stand-by time elapses since the time when the recording ECU 20 is activated. A VIN is acquired by the CPU 20A receiving a signal indicating the VIN (VIN of the vehicle 16) stored in the ROM 14A from the engine ECU 14. Processes that are similar to steps S110 and S120, to be discussed later, may be performed instead of acquiring a VIN after a predetermined stand-by time elapses.

In step S20, the CPU 20A receives a signal from the factory inspection device 28. Consequently, the inspection results are acquired.

In step S30, the CPU 20A determines whether the factory shipment inspection has been passed. When the CPU 20A makes a negative determination (No in step S30), the CPU 20A advances the control for recording a VIN to step S70. When the CPU 20A makes an affirmative determination (Yes in step S30), the CPU 20A advances the control for recording a VIN to step S40. Step S30 may be omitted.

In step S40, the CPU 20A reads the VIN stored in the RAM 20C, and records the VIN in a first recording region 22A of the recording device 22.

In step S50, the CPU 20A determines whether the VIN has been recorded normally in the recording device 22, by determining whether the VIN recorded in the first recording region 22A of the recording device 22 is the same as the VIN stored in the RAM 20C, for example. When an affirmative determination is made (Yes in step S50), the CPU 20A proceeds to step S60. In step S60, the CPU 20A determines that the vehicle 16 can be shipped. When a negative determination is made (No in step S50), the CPU 20A proceeds to step S70. In step S70, the CPU 20A determines that the vehicle 16 cannot be shipped. The results of the determinations in steps S60 and S70 may be displayed on a display device (not illustrated).

As can be seen from the above description, when the vehicle 16 is shipped from a factory, the VIN stored in the ROM 14A of the engine ECU 14 is acquired by the recording ECU 20 (step S10), and recorded in the first recording region 22A of the recording device 22 (step S40). When the inspection by the factory inspection device 28 is passed and the VIN is normally recorded in the first recording region 22A of the recording device 22, an affirmative determination is made in steps S30 and S50. Then, it is determined in step S60 that the vehicle 16 can be shipped. Hence, in the vehicle to be shipped, the VIN recorded in the first recording region 22A of the recording device 22 is the same as the VIN stored in the ROM 14A of the engine ECU 14.

Control for Provisional Recording of VIN at Start of Travel and for Recording of VIN at Time of Accident Next, a control routine for provisionally recording a VIN at the start of travel and for recording a VIN at the time of an accident will be described with reference to the flowchart illustrated in FIG. 3. The control for recording a VIN according to the flowchart illustrated in FIG. 3 is executed by the CPU 20A of the recording ECU 20 when the ignition switch (not illustrated) is turned on.

First, in step S110, the CPU 20A starts receiving a signal indicating a VIN transmitted from the engine ECU 14. Then, the CPU 20A acquires a VIN at each predetermined time set in advance. The CPU 20A records the acquired VIN in a recording region of the RAM 20C for normal determination.

In step S120, the CPU 20A determines whether the same, normal VIN has been acquired three times consecutively. When a negative determination is made (No in step S120), the CPU 20A executes step S120 again. When an affirmative determination is made (Yes in step S120), the CPU 20A proceeds to step S130. In step S130, the CPU 20A records the VIN in a provisional recording region of the RAM 20C.

In step S140, the CPU 20A determines whether a condition for recording a VIN set in advance for an accident of the vehicle 16 is met. When the CPU 20A makes a negative determination (No in step S140), the CPU 20A advances the control for recording a VIN to step S170. When the CPU 20A makes an affirmative determination (Yes in step S140), the CPU 20A proceeds to step S150. In step S150, the CPU 20A reads a VIN from the RAM 20C, and records the VIN in a second recording region 22B of the recording device 22. The condition for recording a VIN may be any condition that is known in the technical field for determining that an accident of the vehicle 16 has occurred.

The CPU 20A records information on the vehicle required to analyze the accident in the accident information recording region 22C of the recording device 22 as accident information in step S160, and ends the control for recording a VIN. The information on the vehicle required to analyze the accident is recorded in the RAM 20C.

In step S170, the CPU 20A determines whether the ignition switch (not illustrated) is turned off. When a negative determination is made (No in step S170), the CPU 20A returns the control for recording a VIN to step S140. When an affirmative determination is made (Yes in step S170), the CPU 20A proceeds to step S180. The CPU 20A clears the VIN recorded in the provisional recording region of the RAM 20C in step S180, and ends the control for recording a VIN.

As can be seen from the above description, a VIN is acquired from the ROM 14A of the engine ECU 14 when the recording ECU 20 is activated in preparation to start travel of the vehicle 16. That is, when the vehicle 16 starts traveling, the VIN stored in the ROM 14A of the engine ECU 14 is acquired by the recording ECU 20 at each predetermined time (step S110). When the same, normal VIN is acquired three times consecutively, the VIN is recorded in the provisional recording region of the RAM 20C (steps S120 and S130).

When the vehicle 16 encounters an accident and the condition for recording a VIN set in advance for an accident of the vehicle is met, further, an affirmative determination is made (step S140), and the VIN is read from the RAM 20C. Then, the VIN is recorded in the second recording region 22B of the recording device 22 (step S150). Further, accident information on the vehicle 16 is recorded in the accident information recording region 22C of the recording device 22 (step S160).

Hence, in a situation in which the vehicle 16 has encountered an accident, the VIN recorded in the second recording region 22B of the recording device 22 is the same as the VIN stored in the ROM 14A of the engine ECU 14. Further, the information recorded in the accident information recording region 22C of the recording device 22 is accident information on the vehicle 16.

Thus, it can be determined whether the recording ECU 20 has been replaced etc., by determining whether the VINs recorded in the first and second recording regions of the recording device 22 are the same as the VIN stored in the ROM 14A of the engine ECU 14 after the accident of the vehicle 16. Further, the situation of the vehicle before and after the occurrence of the accident can be presumed based on the accident information recorded in the accident information recording region 22C of the recording device 22 in a predetermined time range.

Various Cases

Table 1 given below indicates various cases C1 to C9 with different combinations of the VIN of the vehicle 16, the VIN recorded in the first recording region 22A, and the VIN recorded in the second recording region 22B. In Table 1, "AAA" indicates the VIN of the vehicle 16, that is, the VIN stored in the ROM 14A of the engine ECU 14, and "BBB" indicates a VIN that is different from "AAA". While the VINs each have three letters in Table 1, the VINs may have any number of letters.

TABLE 1

| Case | VIN of vehicle 16 | VIN recorded in first recording region 22A | VIN recorded in second recording region 22B |
| --- | --- | --- | --- |
| C1 | AAA | AAA | AAA |
| C2 | AAA | AAA | BBB |
| C3 | AAA | AAA | No record |
| C4 | AAA | BBB | AAA |
| C5 | AAA | BBB | BBB |
| C6 | AAA | BBB | No record |
| C7 | AAA | No record | AAA |
| C8 | AAA | No record | BBB |
| C9 | AAA | No record | No record |

Case C1

The VIN recorded in the first recording region 22A and the VIN recorded in the second recording region 22B are AAA, which is the same as the VIN of the vehicle 16. Hence, the recording ECU 20 has not been replaced, and the accident information recorded in the accident information recording region 22C of the recording device 22 is accident information on the vehicle 16. Thus, it is possible to presume the situation of the vehicle before and after the occurrence of the accident based on the recorded accident information.

Case C2

While the VIN recorded in the first recording region 22A is AAA, which is the same as the VIN of the vehicle 16, the VIN recorded in the second recording region 22B is BBB, which is different from the VIN of the vehicle 16. It is presumed that the recording ECU 20 was temporarily transferred to a vehicle other than the vehicle 16, accident information on the vehicle other than the vehicle 16 was recorded in the accident information recording region 22C of the recording device 22, and thereafter the recording ECU 20 was transferred back to the vehicle 16. Hence, the accident information recorded in the accident information recording region 22C is accident information on the vehicle other than the vehicle 16.

Case C3

While the VIN recorded in the first recording region 22A is AAA, which is the same as the VIN of the vehicle 16, no VIN is recorded in the second recording region 22B. It is presumed that the recording ECU 20 has not been replaced, and that the condition for recording a VIN set in advance has not been met.

Case C4

The VIN recorded in the first recording region 22A is BBB, which is different from the VIN of the vehicle 16. The VIN recorded in the second recording region 22B is AAA, which is the same as the VIN of the vehicle 16. Although the recording ECU 20 has been replaced, the information recorded in the accident information recording region 22C of the recording device 22 is accident information on the vehicle 16. Hence, it is possible to presume the situation of the vehicle before and after the occurrence of the accident based on the recorded accident information.

Case C5

The VIN recorded in the first recording region 22A and the VIN recorded in the second recording region 22B are BBB, which is different from the VIN of the vehicle 16. The recording ECU 20 has been replaced with a recording ECU of a different vehicle, and the information recorded in the accident information recording region 22C of the recording device 22 is accident information on the different vehicle, rather than accident information on the vehicle 16.

Case C6

The VIN recorded in the first recording region 22A is BBB, which is different from the VIN of the vehicle 16. No VIN is recorded in the second recording region 22B. It is presumed that the recording ECU 20 has been replaced with a recording ECU of a different vehicle, and that the condition for recording a VIN set in advance was not met in the different vehicle.

Case C7

No VIN is recorded in the first recording region 22A. The VIN recorded in the second recording region 22B is AAA, which is the same as the VIN of the vehicle 16. The recording ECU 20 has been replaced with a recording ECU as a supply component after the shipment of the vehicle 16, and the information recorded in the accident information recording region 22C of the recording device 22 is accident information on the vehicle 16. Hence, the situation of the occurrence of the accident can be presumed based on the recorded accident information.

Case C8

No VIN is recorded in the first recording region 22A. The VIN recorded in the second recording region 22B is BBB, which is different from the VIN of the vehicle 16. It is presumed that the recording ECU 20 has been replaced with a recording ECU as a supply component after the shipment of the vehicle 16. Hence, the information recorded in the accident information recording region 22C of the recording device 22 is accident information on a different vehicle, rather than accident information on the vehicle 16.

Case C9

No VIN is recorded in the first recording region 22A or the second recording region 22B. It is presumed that the recording ECU 20 has been replaced with a recording ECU as a supply component after the shipment of the vehicle 16, and that the condition for recording a VIN set in advance has not been met.

Effects of Embodiment

In the embodiment, a VIN is recorded in the first recording region 22A of the recording device 22 when the vehicle 16 is shipped. Thus, it is possible to determine whether the recording ECU 20 has been replaced, whether the information recorded in the accident information recording region 22C of the recording device 22 is accident information on the vehicle 16, etc.

With the embodiment, in particular, it is possible to determine whether the recording ECU 20 has been replaced and accident information on a different vehicle has been recorded in the accident information recording region 22C, by determining whether the VINs recorded in the first and second recording regions 22A and 22B are the same as the VIN stored in the ROM 14A of the engine ECU 14.

With the embodiment, further, it is possible to determine whether the recording ECU 20 has been replaced and accident information on a different vehicle has been recorded in the accident information recording region 22C, by determining whether the VIN of the vehicle 16 is recorded in the second recording region 22B when the VIN of a vehicle other than the vehicle 16 is recorded in the first recording region 22A.

As discussed earlier, when the ignition switch is turned on and the recording ECU 20 is activated, the recording ECU 20 acquires a VIN by receiving a signal indicating the VIN transmitted from the engine ECU 14. Hence, the VIN of the vehicle can be recorded in the first recording region 22A before the vehicle 16 substantially starts traveling. Thus, even if an accident is encountered immediately after the vehicle starts traveling, the VIN can be recorded in the second recording region 22B, and accident information can be recorded in the accident information recording region 22C.

In the embodiment, further, the VIN acquired from the ROM 14A is recorded in the first recording region 22A as the provisional recording device, and the VIN recorded in the first recording region 22A is recorded in the second recording region 22B when accident information is recorded in the accident information recording region 22C. Hence, it is possible to suppress the VIN recorded in the first recording region 22A being unnecessarily recorded in the second recording region 22B when it is not determined that the condition for recording set in advance is met and accident information is not recorded in the accident information recording region 22C.

When the ignition switch is turned on, the recording ECU 20 and the engine ECU 14 are activated. Immediately after the recording ECU 20 is activated, however, a signal indicating a VIN may not be adequately received from the engine ECU 14 even if the recording ECU 20 requests the engine ECU 14 to transmit a signal indicating a VIN.

Figure 4:
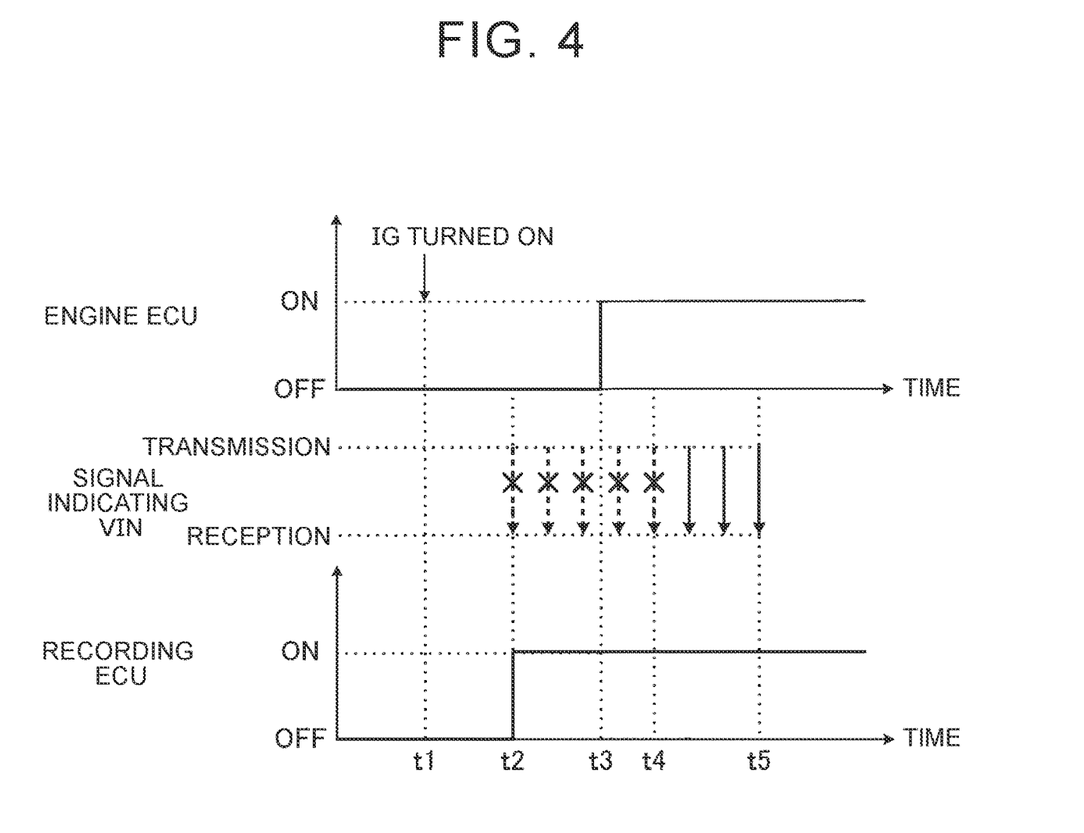

FIG. 4 is a time chart illustrating a situation in which a signal indicating a VIN is transmitted from the engine ECU 14 to the recording ECU 20 after the ignition switch is turned on, for example.

As illustrated in FIG. 4, the ignition switch (IG) is turned on at time t1. It is assumed that the recording ECU 20 and the engine ECU 14 are activated at time t2 and time t3, respectively. It is also assumed that the reception of a signal indicating a VIN is started at time t2, that a signal indicating a normal VIN is not received from time t2 to time t4, and that a signal indicating the same, normal VIN is received three times consecutively from time t4 to time t5. In FIG. 4, the continuous arrows indicate a signal indicating a VIN, and the dashed arrows indicate that the signal is not a signal indicating a normal VIN.

If a VIN is recorded in the provisional recording region of the RAM 20C based on the signals received from time t2 to time t4, an incorrect VIN is recorded in the provisional recording region of the RAM 20C. Thus, an incorrect VIN is recorded in the second recording region 22B of the recording device 22 in step S150. Therefore, it cannot be determined which of the above cases C1 to C9 the present case is.

In the embodiment, on the contrary, when it is determined in step S120 that the same, normal VIN has been acquired three times consecutively, the VIN is recorded in the provisional recording region of the RAM 20C in step S130. When it is determined in step S140 that the condition for recording a VIN set in advance for an accident of the vehicle is met, further, the VIN is read from the RAM and the VIN is recorded in the second recording region 22B of the recording device 22 in step S150.

Hence, the correct VIN can be recorded in the provisional recording region of the RAM 20C and the second recording region 22B of the recording device 22. Thus, it is possible to reliably determine which of the above cases C1 to C9 the present case is, and to accurately determine whether the recording ECU 20 has been replaced etc.

While the present disclosure has been described in detail above based on a specific embodiment, the present disclosure is not limited to the embodiment discussed above. It would be clear to a person skilled in the art that a variety of other embodiments can be made within the scope of the present disclosure.

For example, in the embodiment discussed above, the read-only storage device that stores a vehicle identification number as vehicle identification information of the vehicle 16 is the ROM 14A of the engine ECU 14. However, the read-only storage device may be a ROM of an ECU other than the engine ECU 14 and the recording ECU 20.

In the embodiment discussed above, the VIN is recorded in the second recording region 22B of the recording device 22 in step S150, and accident information on the vehicle 16 is recorded in the accident information recording region 22C of the recording device 22 in step S160. However, the VIN may be recorded in the second recording region 22B of the recording device 22 after accident information on the vehicle 16 is recorded in the accident information recording region 22C of the recording device 22.

In the embodiment discussed above, further, the recording ECU 20 acquires a VIN from the engine ECU 14 immediately after being activated. However, the recording ECU 20 may acquire a VIN from the engine ECU 14 and record the VIN in the second recording region 22B of the recording device 22 at any time during a period since the recording ECU 20 is activated until the recording ECU 20 records accident information in the accident information recording region 22C of the recording device 22.

In the embodiment discussed above, further, the control for recording a VIN according to the flowchart illustrated in FIG. 2 is executed after the factory inspection device 28 determines that the factory shipment inspection has been passed. However, the factory shipment inspection by the factory inspection device 28 may be executed in place of step S20.

In the embodiment discussed above, further, the combination of the VIN of the vehicle 16, the VIN recorded in the first recording region 22A, and the VIN recorded in the second recording region 22B is verified, as indicated in Table 1, in the verification of the record of VINs after an accident of the vehicle. The VIN of the vehicle 16 is the VIN stored in the ROM 14A of the engine ECU 14. However, the VIN of the vehicle 16 to be used in the verification of the record may be a VIN engraved on a frame of the vehicle etc.

Further, it may be determined whether the VIN of the vehicle 16, that is, the VIN stored in the ROM 14A of the engine ECU 14, is the same as the VIN engraved on a frame of the vehicle etc., in addition to the verification of the combination of the three VINs indicated in Table 1. With this determination, it is possible to verify whether the engine ECU 14 has been replaced.

What is claimed is:

1. An accident information recording device that is removably mounted on a vehicle, the accident information recording device comprising:
    a non-volatile memory including a first recording region and a second recording region different from the first recording region; and
    a processor including a volatile provisional memory, wherein the processor is configured to
        acquire first vehicle identification information at a time when a first vehicle is shipped from a factory, the first vehicle identification information including information identifying the first vehicle on which the accident information recording device is mounted at the time when the first vehicle is shipped from the factory,
        record the acquired first vehicle identification information in the first recording region at the time the first vehicle is shipped from the factory,
        start in response to activation of a vehicle on which the accident information recording device is mounted, after is the first vehicle has been shipped,
        acquire second vehicle identification information after the processor starts, the second vehicle identification information including information identifying the vehicle on which the accident information recording device is mounted at a time when the processor acquires the second vehicle identification information,
        record the second vehicle identification information in the provisional memory, and
        determine, after acquiring the second vehicle identification information, whether a condition is met in the vehicle on which the accident information recording device is mounted, the condition being a condition for starting to record information on an accident in a case where the accident involving the vehicle on which the accident information recording device is mounted has occurred, and
        determine whether the vehicle on which the accident information recording device is mounted has stopped, wherein:
    in response to determining that the condition is met, the processor is configured to
        (i) record information on the accident in the non-volatile memory, and
        (ii) record the second vehicle identification information that is recorded in the provisional memory, in the second recording region; and
    in response to determining that the vehicle has stopped without determining that the condition is met during a period from when the processor starts to when the processor determines that the vehicle has stopped, the processor is configured to clear the second vehicle identification information recorded in the provisional memory.

2. The accident information recording device according to claim 1, wherein the processor is configured to acquire the second vehicle identification information in response to being activated in preparation to start travel of the vehicle.

3. The accident information recording device according to claim 1, wherein the information on the accident is information required to analyze the accident.

4. The accident information recording device according to claim 3, wherein the information on the accident includes at least one of:
    information on vehicle speed of the vehicle;
    information on a master cylinder pressure of the vehicle; and
    an accelerator operation amount of the vehicle.

5. An accident information recording device that is replaceable between a first vehicle and a second vehicle, the accident information recording device comprising:
    a non-volatile memory including a first recording region and a second recording region different from the first recording region; and
    a processor including a volatile provisional memory, wherein the processor is configured to:
        acquire first vehicle identification information at a time when a first vehicle is shipped from a factory, the first vehicle identification information including information identifying the first vehicle on which the accident information recording device is mounted at the time when the first vehicle is shipped from the factory; and record the acquired first vehicle identification information in the first recording region at the first vehicle is shipped from the factory, wherein after the first vehicle and the second vehicle have been shipped, the processor is configured to:

(A) in a case that the accident information recording device is mounted on the first vehicle, start in response to activation of the first vehicle, acquire the first vehicle identification information, after the processor starts, record the first vehicle identification information in the provisional memory, determine, after acquiring the first vehicle identification information, whether a condition is met in the first vehicle, the condition being a condition for starting to record information on an accident in a case where the accident involving a vehicle on which the accident information recording device is mounted has occurred, determine whether the first vehicle has stopped, and (A-1) in response to determining that the condition is met in the first vehicle, record information on the accident in the non-volatile memory, and record the first vehicle identification information that is recorded in the provisional memory in the second recording region, and (A-2) in response to determining that the first vehicle has stopped without determining that the condition is met in the first vehicle during a period from when the processor starts to when the processor determines that the first vehicle has stopped, clear the first vehicle identification information recorded in the provisional memory; and (B) in a case that the accident information recording device is removed from the first vehicle and mounted on the second vehicle, start in response to activation of the second vehicle, acquire second vehicle identification information of the second vehicle identification, after the processor starts, record the second vehicle identification information in the provisional memory, determine, after acquiring the second vehicle identification information, whether the condition is met in the second vehicle, determine whether the second vehicle has stopped, and (B-1) in response to determining that the condition is met in the second vehicle, record information on the accident in the non-volatile memory, and record the second vehicle identification information that is recorded in the provisional memory in the second recording region, and (B-2) in response to determining that the second vehicle has stopped without determining that the condition is met in the second vehicle during a period from when the processor starts to when the processor determines that the second vehicle has stopped, clear the second vehicle identification information recorded in the provisional memory.

* * * * *